United States Patent
Suzuki et al.

[11] 3,864,398
[45] Feb. 4, 1975

[54] PROCESS FOR THE PREPARATION OF ACYLAMINO ALKANOL DERIVATIVES

[75] Inventors: Yasushi Suzuki, Yokohama; Kunio Tsukamoto, Zushi, both of Japan

[73] Assignee: Teikoku Hormone Mfg. Co., Ltd., Minato-ku, Tokyo, Japan

[22] Filed: May 1, 1972

[21] Appl. No.: 249,196

[52] U.S. Cl.............. 260/562 A, 260/390, 260/47 C, 260/551 S, 260/551 P, 260/556 AR, 260/558 P, 260/326 A, 260/326.44, 260/326 C
[51] Int. Cl................................................ C07c 103/38
[58] Field of Search........... 260/562, 558, 559, 556, 260/326, 471, 551

[56] References Cited
UNITED STATES PATENTS

| | | | |
|---|---|---|---|
| 3,408,387 | 10/1968 | Howe et al. | 260/562 |
| 3,562,297 | 2/1971 | Howe et al. | 260/562 |
| 3,574,749 | 4/1971 | Howe et al. | 260/562 |
| 3,634,511 | 1/1972 | Howe et al. | 260/562 |
| 3,712,927 | 1/1973 | Howe et al. | 260/471 |

FOREIGN PATENTS OR APPLICATIONS

| | | | |
|---|---|---|---|
| 7,017,367 | 6/1971 | Netherlands | 260/566 |

OTHER PUBLICATIONS
Gaertner, Tetrahedron Letters, p. 343-347 (1967).
Gaertner, J. Org. Chem., vol. 33, p. 523-530 (1968).

*Primary Examiner*—Harry I. Moatz
*Attorney, Agent, or Firm*—Sherman & Shalloway

[57] ABSTRACT

A novel process for the production of 1-(acylamino-aryloxy)-3-amino-propanol derivative having an excellent β-adrenergic blocking effect. The process comprises basically reacting a compound of the formula

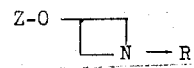

wherein Z is a hydrogen atom or a protective group bonded to the oxygen atom by an aliphatic ether linkage, and R stands for an alkyl or aralkyl group, with a compound of the formula

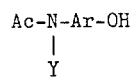

wherein Ar stands for a substituted or unsubstituted benzene or naphthalene ring, Ac indicates an organic acid residue, and Y represents a hydrogen atom, a monovalent hydrocarbon radical having up to 12 carbon atoms or an organic acid residue, or Y may be bonded to the group Ac to form a diacyl group.

11 Claims, No Drawings

PROCESS FOR THE PREPARATION OF ACYLAMINO ALKANOL DERIVATIVES

This invention relates to a process for the preparation of 1-(acylamino-aryloxy-3amino propanol derivatives from tertiary azetidinol derivatives.

More specifically, this invention relates to a process for the preparation of 1-(acylamino-aryloxy)-3-substituted-amino-propanol derivatives expressed by following general formula (III)

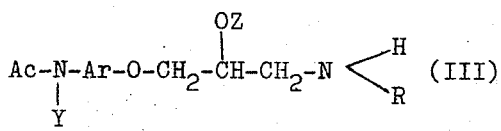

wherein Ar stands for a substituted or unsubstituted benzene or naphthalene ring, Ac indicates an organic acid residue, Y represents a hydrogen atom, a monovalent hydrocarbon radical having up to 12 carbon atoms or an organic acid residue, or Y may be bonded to the group Ac to form a diacyl group, Z is a hydrogen atom or a protective group bonded to the oxygen atom by an aliphatic ether linkage, and R stands for an alkyl or aralkyl group, or their non-toxic acid addition salts.

Compounds of above general formula (III) obtained by the process of this invention have a specific structure characterized in that an acylamino group is further bonded to the aryl group of the 1-aryloxy-3-substituted-amino-propanol derivative.

It has heretofore been known that compounds of general formula (III) have the β-adrenergic blocking property. Especially, 1-(4'-acetoamidophenoxy)-3-iso-propylamino-2-propanol having the following structure

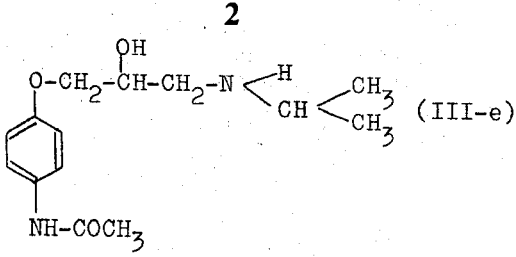

has a high organ selectivity, that is, this compound acts selectively on heart muscle alone, and therefore, the compound has been known as an excellent β-adrenergic blocking agent that can even be administered to patients suffering from cardiac insufficiency.

However, known processes for preparing 1-(acylamino-aryloxy)-3-substituted-amino-propanol derivatives expressed by formula (III) or (III-e) inevitably include many complicated steps. Therefore, the reaction operations are troublesome and involve various difficulties in these known processes. Further, since incorporation of impurities formed by side reactions cannot be avoided with decrease of the yield of the end product, it costs a great deal to obtain the intended end product of high purity according to these known processes.

For instance, the conventional process for preparing 1-(4'-acetoamidophenoxy)-3-iso-propylamino-2-propanol of formula (III-e) requires many steps as expressed by the following reaction formula A (see Chemical Abstracts, 65, 7099 (1966) ):

Reaction Formula A

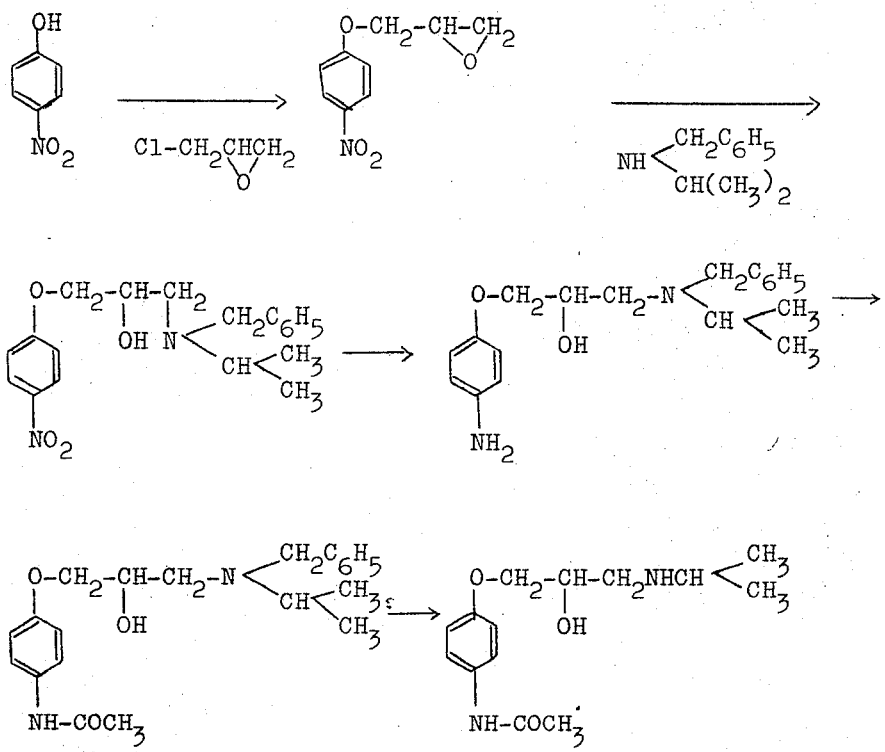

Another process expressed by the following reaction formula B has been known (Chemical Abstracts, 65, 7099 (1966)):

Reaction Formula B

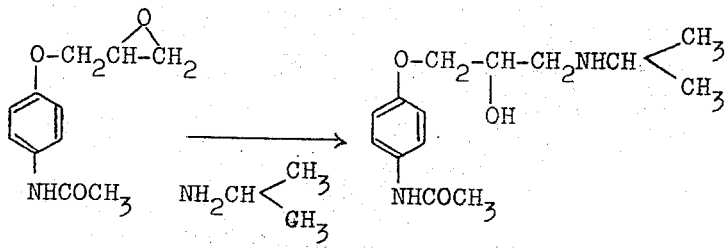

In the process expressed by above reaction formula B, in order to react 1-(4'-acetamidophenoxy)-2,3-epoxypropane with an equimolar amount of iso-propyl amine, it is necessary to employ iso-propyl amine in great excess. Further, since the basicity of iso-propyl amine is higher than that of an aromatic amine, in the above process the acetyl group is split off by the ammonolysis reaction and as a result 1-(4'-aminophenoxy)-2,3-epoxypropane or its iso-propylamino-substituted product is formed as a by-product, which further reacts with the epoxy ring. As a result, the yield of the intended product (III-e) is reduced and incorporation of by-products into the intended product cannot be avoided. These are fatal defects of the known process expressed by reaction formula B.

It has now been found that when according to the process of this invention a 1-substituted-3-azetidinol or its protected derivative expressed by the following formula

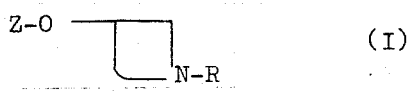

is reacted with an acylamino-phenol or acylamino-naphthol derivative expressed by the following formula

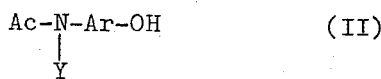

a 1-(acylamino-aryloxy)-3-substituted-amino-propanol derivative expressed by the following general formula (III)

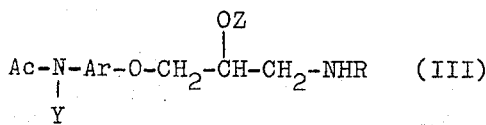

can be obtained at a high purity and in a high yield by one step. In the above-mentioned process of this invention, if the resulting compound of formula (III) has a protective group as Z, the protective group is readily split off by a known method and the radical -OZ is readily converted to the hydroxyl group -OH. In the above general formulae (I), (II) and (III), each of Ac, Ar, Y, R and Z is as previously defined with respect to formula (III).

As is seen from the reaction between compounds expressed by above formulae (I) and (II), the process of this invention is characterized in that the direct reaction of a phenol or naphthol derivative of formula (II) having a substituted or unsubstituted acylamino group with a 3-azetidinol derivative of formula (I) containing a tertiary nitrogen atom results in ring-opening of the 3-azetidinol derivative of formula (I) and the intended 1(acylamino-aryloxy)-3-substituted-amino-propanol derivative of formula (III) can be formed by one step while the acylamino group of the phenol or naphthol derivative is not at all attacked by the reaction but can be retained stably. Unexpected great advantages of the process of this invention are brought about by such characteristic features.

This invention will now be illustrated in more detail.

TERTIARY AZETIDINOL DERIVATIVE OF GENERAL FORMULA (I)

In the tertiary azetidinol derivative of general formula (I), it is preferred that the group R is an alkyl group having up to 12 carbon atoms, especially up to 5 carbon atoms, or an aralkyl group having 7 to 9 carbon atoms. The alkyl group may be either a straight-chain alkyl group or a branched-chain alkyl group, but a branched-chain alkyl group is preferred.

It is especially preferred that Z is a hydrogen atom (H) or a protective group (Za) and R is a branched-chain alkyl group of up to 5 carbon atoms as such, for example, iso-propyl, tert-butyl, iso-butyl and sec-butyl groups. The case where R is an iso-propyl group is especially advantages. When the Z stands for a protective group, it may be any of the groups known to be protective groups for the hydroxyl group. Preferable examples of the protective group Za include those expressed by the following formula

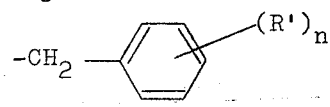

wherein R' is any of the groups having such property that the group

as a whole can be split off under the reduction conditions; more specifically, R' preferably stands for a hydrogen atom, an alkoxy group having up to 3 carbon atoms, such as methoxy, ethoxy and propoxy groups, an alkyl group having up to 3 carbon atoms, such as methyl, ethyl, n-propyl and iso-propyl groups, a halogen atom such as chlorine and bromine, a halogenated alkyl group such as a trifluoromethyl group, an amino group, a group convertible to an amino group such as a nitro group, or other electron-donor group, and $n$ is an integer of from 1 to 3, preferably 1, it being especially preferred that the substituent $(-R')_n$ is bonded to the 4-position of the benzene ring, and alkoxyalkyl protective groups such as methoxymethyl, ethoxymethyl and benzyloxymethyl groups.

Among the tertiary azetidinol derivatives expressed by general formula (I), compounds expressed by the following formula (I-a)

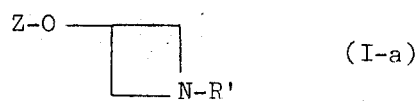

wherein R' is a straight-chain or branched-chain alkyl group having 1 to 5 carbon atoms, and Z stands for a hydrogen atom (H) or a protective group (Za) bonded to the oxygen atom by an aliphatic ether linkage, are preferably employed. From the viewpoint of the pharmaceutical activity, compounds having an iso-propyl, sec-butyl, iso-butyl or tert-butyl group as the group R and a hydrogen atom as Z are especially preferred among compounds expressed by formula (I-a).

PROCESS FOR PREPARATION OF TERTIARY AZETIDINOL DERIVATIVE OF FORMULA (I)

The 1-substituted-3-azetidinols and hydroxy-protected derivatives thereof of general formula (I) to be used as starting substances in the process of this invention are novel compounds exclusive of a few exceptions. These compounds may be prepared, for instance, by a method comprising reacting a compound expressed by the following formula

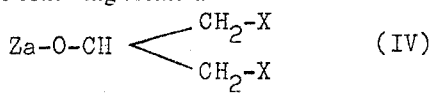
(IV)

wherein X stands for a halogen atom or a reactive ester residue, and Za is as defined above with respect to the protective group Z, with a primary amine expressed by the following formula $$H_2N-R \quad (V)$$

wherein R is as defined above, to form 1-substituted-azetidinol derivative of the following formula, whose 3-position is protected,

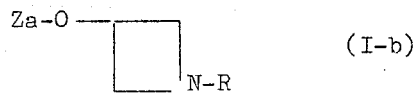
(I-b)

and, if desired, splitting off the protective group Za from the so formed azetidinol derivative of formula (I-b) by a method known per se, for instance, by the hydrogen reduction, to thereby convert it to an azetidinol derivative expressed by the following formula

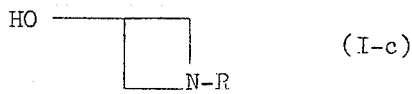
(I-c)

wherein R is as defined above.

For instance, 1-iso-propyl azetidinol of the following formula

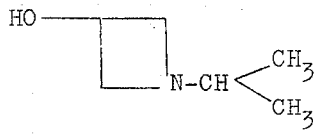

which is the starting compound to be used for the preparation of the compound of formula (III-e), i.e., the most desired intended compound in the process of this invention, may readily be prepared by a method comprising reacting a compound expressed by the following formula

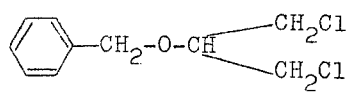

with a compound expressed by the following formula

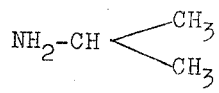

and reducing the resulting compound of the following formula

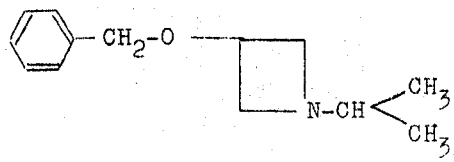

with hydrogen in the presence of a known reduction catalyst such, for example, as a Raney nickel catalyst.

Although the above reaction between the compound of formula (IV) and the amine of formula (V) may be carried out in the absence of a solvent, in order to inhibit formation of diamines or polymers as by-products and obtain an azetidinol derivative of formula (I-b) in a high yield, it is preferable to conduct the reaction in the presence of a suitable inert liquid medium. Benzyl alcohol is most desirable as such inert liquid medium, but other organic solvents, for instance, high boiling point organic solvents such as xylene, mesitylene and decalin may also be used.

The primary amine of formula (V) may be added to the reaction system in the form of an aqueous solution, and it is possible to conduct the reaction while maintaining the state where the compound of above formula (IV) is dispersed in the aqueous solution of the primary amine of formula (V). In general, it is preferred that the primary amine is used in an amount exceeding the stoichiometric amount, for instance, in an amount of 2-5 moles per mole of the compound of formula (IV). Even if the primary amine is used in such molar excess, formation of diamines as by-products is hardly observed.

The reaction may be carried out at a temperature of 100°C. or higher. In order to shorten the reaction time, it is desired to conduct the reaction at 120°–160°C. In such case, the reaction is usually carried out for 10 to 50 hours.

The hydrogen reduction of the compound of formula (I-b) may be accomplished at a temperature ranging from room temperature to 100°C. under a hydrogen pressure of 1 to 100 atmospheres by employing a metal catalyst such, as for example, Raney nickel, Raney cobalt, Urushibara-nickel, palladium and platinum.

PHENOL OR NAPHTHOL DERIVATIVE OF FORMULA (II)

In this invention any optional member selected from acylaminophenols and acylaminonaphthols expressed by the following formula

(II)

wherein Ac, Ar and U are as defined above, is employed. In the compounds of the above general formula (II), the groups

and —OH may be bonded to the phenylene group —Ar— in any of the ortho-, meta- and para-positions, but it is preferred that they are bonded in the para-position. When the group -Ar- is a naphthylene group, the above two groups may be bonded to the naphthylene group in any of 1,2-, 1,3-, 1,4-, 1,5-, 1,6-, 1,7- and 1,8-positions, but it is preferred that they are bonded in the 1,4-, 1,5- or 1,8-position.

As described hereinabove, the group -Ac in general formula (II) stands for an organic acid residue. As such organic acid residue acyl groups such as formyl, acetyl, propionyl, benzoyl, ethoxycarbonyl, methoxycarbonyl, benzyloxycarbonyl, p-methoxybenzyloxycarbonyl and tert-butyloxycarbonyl groups; organic sulfonyl groups such as mesyl, benzylsulfonyl and tosyl groups; organic sulfinyl groups such as benzenesulfinyl and toluenesulfinyl groups; organic sulfenyl groups such as o-nitrophenylsulfenyl and p-nitrophenylsulfenyl groups; and organic phosphonyl groups such as benzenephosphonyl and methanephosphonyl groups may be exemplified. In addition, as an exception a triphenylmethyl group is used equivalently to the organic acid residues recited above. Therefore, this exceptional triphenylmethyl group is included in the organic acid residue in the instant specification and claims. Among these organic acid residues mono- or di-carboxylic acid residues having 1 to 8 carbon atoms are preferable.

When group Y is a hydrocarbon group, preferable examples of group Y are alkyl groups having up to 3 carbon atoms, such as methyl and ethyl groups. The groups Ac and Y may be bonded to each other to form a diacyl group such as ethylenedicarbonyl, maleyl, phthalyl and naphthalyl groups. When Ac is a dicarboxylic acid residue, the groups Ac and Y in formula (II) are linked together and bonded to the nitrogen atom.

The phenylene or naphthylene group expressed as —Ar— in formula (II) may have 1 to 3 substituents ($R_1$, $R_2$ or $R_3$). These substituents $R_1$, $R_2$ and $R_3$ may be the same or different and stand for an alkyl or alkenyl group of 1–4 carbon atoms, an alkoxy group of 1–4 carbon atoms, a hydroxyl group or an amino group. $R_1$ and $R_2$ may be bonded to each other to form an alkylene or ketoalkylene group or to form a 5- or 6-membered heterocyclic ring through a hetero atom.

The group —Y in general formula (II) stands for a hydrogen atom, a monovalent hydrocarbon group having up to 12 carbon atoms or an organic acid residue, and further, the groups Ac— and Y— may be linked together to form a diacyl group such as exemplified above.

Among phenols and naphthols expressed by formula (II), those represented by the following formula $$CH_3CO—NH—Ar'—OH \quad (II\text{-}a)$$

wherein Ar' stands for a phenyl or naphthyl group, especially preferably a phenyl group, are advantageous when respect to their pharmaceutical effects and accordingly, they are greatly preferred.

REACTION CONDITIONS

In accordance with this invention, 1-(acylaminoaryloxy)-3-substituted-amino-2-propanol derivatives (intended products) expressed by following formula (III)

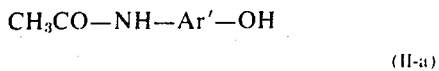
(III)

wherein Ac, Ar, Y, Z and R are as defined above, are formed by reacting a tertiary azetidinol derivative expressed by formula (I) with a phenol or naphthol expressed by formula (II), more specifically a phenol or naphthol substituted by a substituted or unsubstituted acylamino group in the presence or absence of an organic solvent which is inert to the reaction.

The reaction may be carried out in the absence of a solvent or in the presence of an inert solvent, preferably a non-polar organic solvent, as for example, benzene, xylene, ether, benzyl alcohol, decalin and dioxane. In general, the reaction of this invention is allowed to advance at elevated temperatures ranging from 130° to 250°C., preferably 150° to 180°C., but the temperature range is not particularly critical in this invention. The reaction may be carried out under either atmospheric or elevated pressures.

The reaction of this invention is allowed to advance smoothly even in the absence of a catalyst, but if desired, it is possible to employ a basic catalyst such as solid potassium hydroxide, sodium hydroxide or triethylamine, or an acidic catalyst such as trifluoroacetic acid or a highly acidic cation-exchange resin.

In accordance with one preferable embodiment of this invention, a tertiary azetidinol derivative of formula (I) is reacted with a phenol or naphthol derivative expressed by formula (II) in the molten state or in the presence of an organic solvent inert to the reaction, such as benzyl alcohol and xylene, in the presence of a solid caustic alkali in an amount of 1/100 to 1/10 mole per mole of the phenol or naphthol. In this embodiment it is advantageous to employ the phenol or naphthol in an amount slightly excessive based on the tertiary azetidinol derivative, for instance, in an amount of at least 1.1 moles, preferably at least about 1.2 moles, per mole of the tertiary azetidinol derivative.

Products expressed by general formula (III) are formed by the above-mentioned reaction. Accordingly, in this invention, if, for instance, an azetidinol derivative expressed by formula (I-a) is reacted with a phenol or naphthol expressed by formula (II-a) under reaction conditions such as explained above, a 1-(acylamino-aryloxy-3-substituted-amino-2-propanol derivative expressed by the following formula

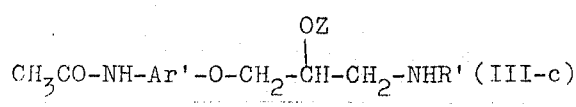 (III-c)

wherein Ar', Z and R' are as defined above, is formed. When Z in formula (III-c) is a protective group (Za), the resulting compound is subjected to the known hydrogenation reaction, for instance, in the presence of a reduction catalyst such as mentioned above, to thereby split off the protective group (Za) and form a 1-(acylamino-aryloxy)-3-substituted-amino-2-propanol derivative expressed by the following formula

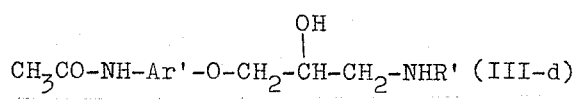 (III-d)

wherein Ar' and R' are as defined above.

In view of pharmaceutical effects, products in which Z in general formula (III) stands for a hydrogen atom, namely products in which the protective group (Za) is split off, are preferred among products obtained according to the process of this invention.

Products expressed by formula (III) or (III-c), especially products in which the protective group (Za) is split off (for instance, products expressed by formula (III-d) ), may be recovered in the form of free bases. It is also possible to convert the free bases to their acid addition salts. As such acid addition salts, salts of non-toxic inorganic or organic acids such, as for example, as hydrochlorides, hydrobromides, sulfates, succinates, tartarate and salicylates may be exemplified.

Non-toxic acid addition salts of compounds expressed by general formula (III) may also be formed directly by reacting an addition salt of a tertiary azetidinol derivative of formula (I) with a non-toxic acid such as mentioned above, with a phenol or naphthol expressed by general formula (II). Accordingly, non-toxic acid addition salts of 1-(acylamino-aryloxy)-3-substituted-amino-2-propanol derivative expressed by above general formula (III-c) or (III-c) can be formed directly by the reaction between non-toxic acid addition salts of compounds of formula (I-a) and compounds of formula (II-a).

In the reaction for forming directly such non-toxic acid addition salts of compounds expressed by formula (III), (III-c) or (III-d), the same reaction conditions as explained hereinabove with respect to the synthesis of free bases may be adopted. When the above reaction is carried out in the presence of a solvent, it is preferable to employ organic solvents capable of dissolving at least partially acid addition salts of the compounds of formula (I) or (I-a). As such solvent polar solvents such, as for example, benzyl alcohol, phenetyl alcohol and dioxane may be advantageously used. It is preferred that such polar solvents have a basicity not higher than that of aniline, and use of non-basic polar solvents is especially preferable and advantageous.

Typical compounds prepared by the process of this invention are exemplified for better illustration, but this invention is not at all limited to these compounds.

* 1-tert-butylamino-3-(4'-acetylamino-2', 3'-dimethylphenoxy)-2-propanol,
* 1-iso-propylamino-3-(4'-acetylamino-phenoxy)2-propanol,
* 1-tert-butylamino-3-(40'-acetylamino-phenoxy)-2-propanol,
* 1-iso-propylamino-3-(2'-acetylamino-phenoxy)-2-propanol,
* 1-tert-butylamino-3-(2'-acetylamino-phenoxy)-2-propanol,
* 1-(4'-acetylamino-1'-naphthyloxy)-3-(tert-butylamino)-2-propanol,
* 1-iso-propylamino-3-(4'-acetylamino-phenoxy)-2-benzyloxypropane, and
* 1-tert-butylamino-3-(4'-acetylamino-2',3'-dimethylphenoxy)-2-benzyloxypropane.

Products of formula (III) in which Z stands for a hydrogen atom, which are represented by the above recited compounds, have excellent β-adrenergic blocking property and are very effective for remedy and prevention of coronary troubles such as heart attack and arrhythmia.

Among products of formula (III) or (II-c) prepared by the process of this invention, products having a protective group (Za) are novel compounds and are useful not only as intermediates for the synthesis of the products free of the protective group (Za), namely products in which Z stands for a hydrogen atom, but also as anti-ulcerative agents for the stomach and duodenum, because they have an activity for controlling secretion of gastric juice.

This invention will now be illustrated in more detail by reference to examples.

EXAMPLE 1

In a nitrogen current, 11.6 parts of p-acetamidophenol and 8.1 parts of 1-iso-propyl-3-azetidinol were dissolved in 50 parts of benzyl alcohol, and in this state 0.3 part of potassium hydroxide was added to the solution. The solution was heated at 140°C. for 6 hours under agitation. After the mixture had been cooled, it was extracted with 2N hydrochloric acid, and the extract was made alkaline to obtain an oily substance, which was then extracted with chloroform. The extract was concentrated to dryness and the residue was recrystallized from n-butyl acetate to yield 13.3 parts of 1-(4'-acetamido-phenoxy)-3-iso-propylamino-2-propanol melting at 133°–134°C. The yield was 69 percent'.

The hydrochloride of 1-(4'-acetamindo-phenoxy)-3-iso-propylamino-2-propanol had a melting point of 139°–142°C.

EXAMPLE 2

A mixture of 16.6 parts of p-acetamidophenol and 20.5 parts of 1-(iso-propyl)-3-benzyloxy-azetidine was heated in a nitrogen gas current at 170°C. for 8 hours under agitation. The reaction mixture was then cooled and dissolved in 100 parts of ether. The solution was washed with 50 parts of water and dried over anhydrous sodium sulfate. Ether was distilled off and the residue was subjected to distillation to yield 20.5 parts of 1-(p-acetamido-phenoxy)-2-benzyloxy-3-(iso-propylamino)propane boiling at 193°–196°under 0.5 mm Hg.

EXAMPLE 3

To 3.6 parts of 1-(p-acetamidophenoxy)-2-benzyloxy-3-(iso-propylamino-propane 10 parts of ethanol were added. Then, 4 parts of ethanol containing Raney nickel were added to the mixture in an autoclave, and the hydrogenation was conducted at 40°C. for 5 hours while maintaining the hydrogen pressure in the autoclave at 40 kg/cm². The reaction mixture was cooled and the catalyst was removed by filtration. When the filtrate was concentrated, 2.4 parts of 1-(p-acetamidophenoxy)-3-(iso-propylamino)-2-propanol having a melting point 132°–134°C. were obtained.

EXAMPLE 4

A mixture of 16.6 parts of p-acetamidophenol and 11.5 parts of 1-(iso-propyl)-3-azetidinol in decalin was heated in a nitrogen current at 150°C. for 5 hours under agitation. The reaction mixture was cooled and dissolved in ether. The solution was washed with water and dried over anhydrous sodium sulfate. Ether was distilled off and the residue obtained was 18.9 parts of 1-(p-acetamidophenoxy)-3-(iso-propylamino)-2-propanol having a melting point of 133°–135°C.

EXAMPLE 5

In 50 parts of benzyl alcohol 19.7 parts of 4-acetamido-2,3-xylenol and 12.9 parts of 1-tert-butyl-3-azetidinol, were dissolved and 0.5 part of potassium hydroxide was added to the solution while heating it to 100°C. in a nitrogen current. The mixture was then heated at 140°C. for 8 hours under agitation. The reaction mixture was cooled and 100 parts of 2N hydrochloric acid were added thereto. The resulting acidic aqueous solution was washed twice with 50 parts of ethyl acetate. The water layer was made alkaline by addition of 8 parts of 4N NaOH and extracted three times with 50 parts of ethyl acetate. The ethyl acetate layer was washed with 50 parts of water, dried over anhydrous sodium sulfate and then concentrated. When the concentrate was allowed to stand in the dark, crystals were precipitated. Recrystallization from ethyl acetate gave 12.4 parts of 1-(4'-acetamido-2',3'-xyloxy)-3-tert-butylamino-2-propanol having a melting point of 107°–108°C. The yield was 52 percent.

4-Acetamido-2,3-xylenol was synthesized in the following manner.

In a nitrogen current, 5.3 parts of finely ground 4-amino-2,3-xylenol hydrochloride were well mixed with 3 parts of finely ground anhydrous sodium acetate. A mixture of 3 parts of anhydrous acetic acid and 6 parts of glacial acetic acid was added to the above mixture, and the resulting mixture was heated under reflux for 3 hours. The reaction mixture was cooled and the resulting solid was dissolved in 50 parts of hot water. When the solution was cooled, crystals were precipitated. Recrystallization from water gave 4.5 parts of 4-acetamido-2,3-xylenol having a melting point of 180–181°C. The yield was 83 percent.

EXAMPLE 6

20.6 parts of 4-methanesulfonamidophenol, 11.5 parts of 1-iso-propyl-3-azetidinol and 0.5 part of potassium hydroxide were dissolved in 50 parts of benzyl alcohol, and the solution was heated at 130°C. for 20 hours under agitation. The reaction mixture was cooled and treated in the same manner as in Example 4. The resulting ethyl acetate solution was dried over anhydrous sodium sulfate and concentrated, and when petroleum ether was added to the concentrate, crystals were formed. Recrystallization from ethyl acetate and petroleum ether gave 14.4 parts of 1-(4'-methanesulfonamido-phenoxy)-3-iso-propylamino-2-propanol melting at 125°–127°C. The yield was 48 percent.

EXAMPLE 7

The following compounds were synthesized by methods illustrated in the preceding examples.

| Chemical Structure | Melting Point |
|---|---|
| 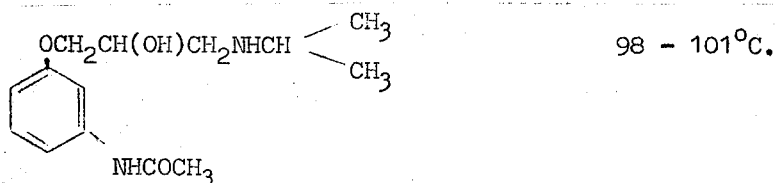 | 98 – 101°C. |
| 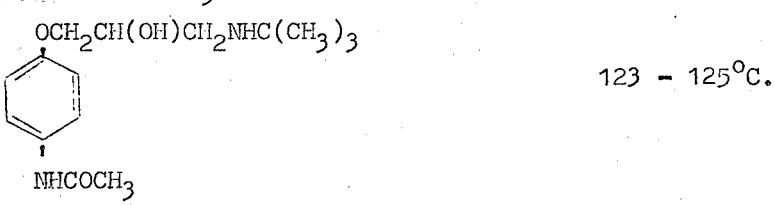 | 123 – 125°C. |
| 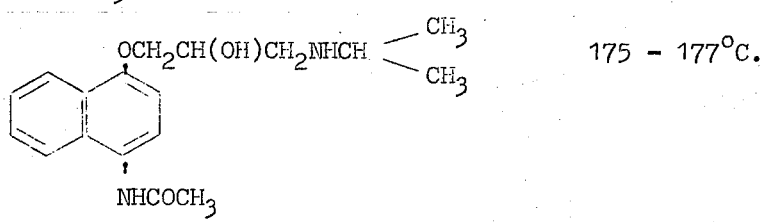 | 175 – 177°C. |
| 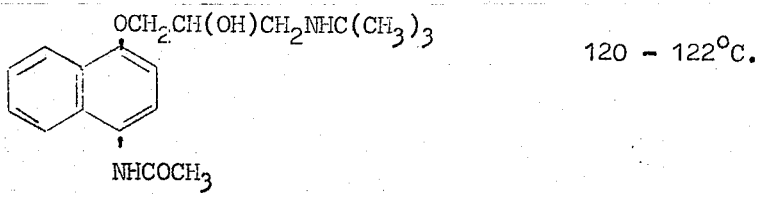 | 120 – 122°C. |
| 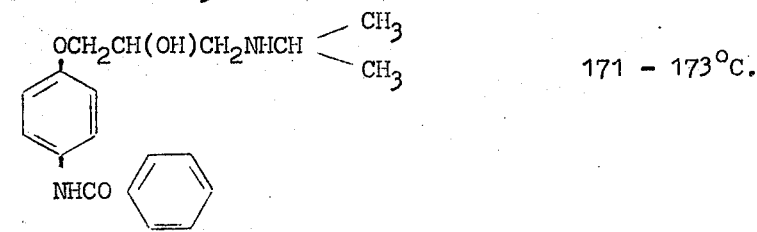 | 171 – 173°C. |
| 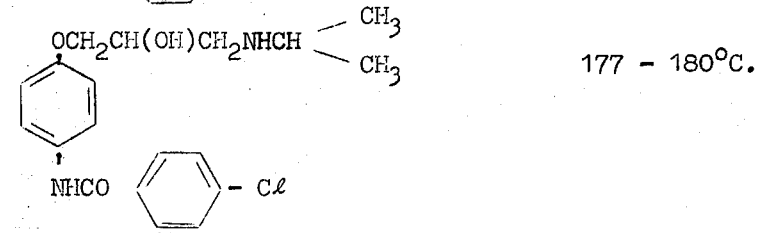 | 177 – 180°C. |

Continued

| Chemical Structure | Melting Point |
|---|---|
| 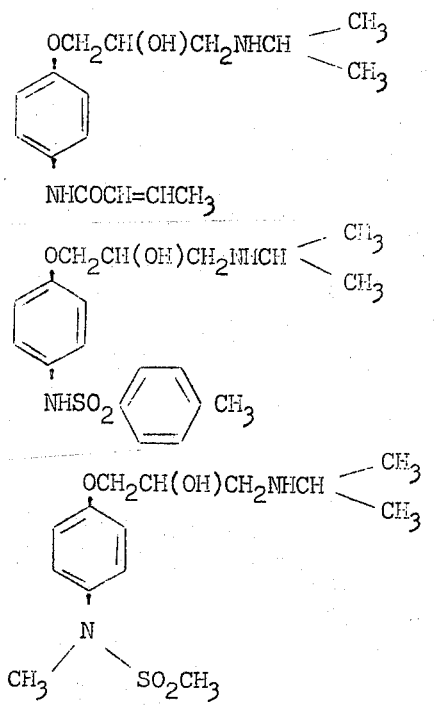 | 126 – 127°C. |
| | 89 – 90°C. |
| | 97 – 98°C. |

EXAMPLE 8

21.9 Parts of 2-benzyloxy-1,3-dichloro-propane, 59.1 parts of iso-propylamine and 59.1 parts of water were taken into an autoclave, and the mixture was heated for 48 hours under agitation. The reaction mixture was cooled and treated in the same manner as in Example 1, followed by distillation under reduced pressure. As a result, 17.4 parts of 3-benzyloxy-1-(isopropyl)-azetidine boiling at 105°–107°C. under 2 mm Hg were obtained. The yield was 85 percent.

EXAMPLE 9

21.9 Parts of 2-benzyloxy-1,3-dichloro-propane, 71.3 parts of tert-butylamine and 50 parts of water were taken into an autoclave, and the mixture was heated at 90°C. for 48 hours agitation. The reaction mixture was cooled and treated in the same manner as in Example 1, followed by distillation under reduced pressure. As a result, 17.5 parts of 3-benzyloxy-1-(tert-butyl)-azetidine boiling at 94°–96°C. under 2 mm Hg were obtained. The yield was 80 percent.

EXAMPLE 10

A solution of 4.1 parts of 3-benzyloxy-1-(iso-propyl)-azetidine in 30 parts of ethanol was taken into an autoclave together with 2 parts of Raney nickel as a catalyst, and under a hydrogen gas pressure of 100 atmospheres, the mixture was agitated at 40°C. for 15 hours to perform the reduction. The catalyst was removed by filtration and the remaining ethanol solution was concentrated to dryness. The resulting oily substance was subjected to distillation under reduced pressure, or dissolved in n-hexane and cooled. As a result 1.9 parts of 1-(iso-propyl-)3-azetidinol was obtained in the form of white crystals. The product had a melting point of 56°–57°C. and a boiling point of 75–76°C. under 3 mm Hg. The yield was 82 percent.

EXAMPLE 11

A solution of 4.4 parts of 3-benzyloxy-1-(tert-butyl)-azetidine in 30 parts of ethanol was taken into an autoclave together with 2 parts of Raney nickel as a catalyst. Under a hydrogen gas pressure of 100 atmospheres, the mixture was stirred at 40°C. for 15 hours to perform the reduction. The catalyst was separated by filtration, and the remaining ethanol solution was concentrated to dryness. The resulting oily substance was dissolved in n-hexane and cooled. As a result 2.0 parts of 1-(tert-butyl)-3-azetidinol melting at 42°–43°C. were obtained. The yield was 76 percent.

EXAMPLE 12

In nitrogen current, 11.6 parts of p-acetamido-phenol and 16.0 parts of 1-iso-propyl-3-azetidinol hydrochloride were dissolved in 50 parts of benzyl alcohol, and the solution was heated at 140°C. for 6 hours under agitation. After the reaction mixture had been evaporated, the residue was recrystallized from methanol-ethyl acetate to yield 14.2 parts of 1-(4'-acetamido-phenoxy)-3-iso-propylamino-2-propanol hydrochloride melting at 140°–142°C.

EXAMPLE 13

In nitrogen current, 19.7 parts of 4-acetamido-2,3-xylenol and 17.1 parts of 1-tert-butyl acetidinol hydrochloride were added to 50 parts of benzyl alcohol, and the mixture was heated at 150°C. for 6 hours under agitation. After the reaction mixture had been evaporated, the residue was recrystallized from methanol-ethyl acetate to yield 13 parts of 1-(4'-acetamido-2',3'-xyloxy)-3-iso-propylamino-2-propanol hydrochloride melting at 129°–131°C.

EXAMPLE 14

In nitrogen current, 11.6 parts of p-acetamido-phenol and 15.3 parts of 1-iso-propyl-3-azetidinol hydrochloride were mixed together, and the mixture was heated at 145°C. for 5 hours. The resulting reaction mixture was recrystallized from methanol-ethyl acetate to yield 11.7 parts of 1-(4'-acetamido-phenoxy)-3-iso-propylamino-2-propanol hydrochloride melting at 139°–141°C.

What we claim is:

1. A process for the preparation of a 1-aryloxy-3-amino-propanol derivative of the formula

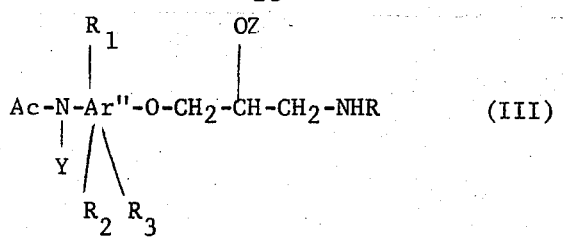

(III)

wherein R represents a straight or branched chain alkyl group having up to 12 carbon atoms or an aralkyl group having 7 to 9 carbon atoms; Ar'' represents a benzene or naphthalene ring; $R_1$, $R_2$ and $R_3$ represent, independently, a hydrogen atom, an alkyl or alkenyl group having 1 to 4 carbon atoms, an alkoxy group having 1 to 4 carbon atoms, a hydroxyl group or an amino group, or $R_1$ and $R_2$ may be bonded together to form an alkylene or ketoalkylene group or to form a 5- or 6-membered heterocyclic ring with a hereto atom; Ac represents an organic acid residue selected from the group consisting of organic carboxylic acid residue, organic sulfonyl groups, organic sulfinyl groups, organic sulfenyl groups, organic phosphonyl groups and triphenylmethyl groups; Y represents hydrogen atom, an alkyl group having up to 3 carbon atoms or the group Ac, or Y may be bonded to the group Ac to form an ethylenedicarbonyl, maleyl, phthalyl or naphthalyl group; and Z is a hydrogen atom, an alkoxyalkyl group, a benzyloxymethyl group or a group of the formula

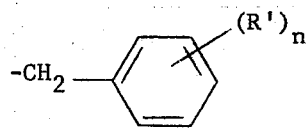

wherein R' is a hydrogen atom or an electron donor group selected from the group consisting of an alkoxy group having up to 3 carbon atoms, an alkyl group having up to 3 carbon atoms, a halogen atom, a halogenated alkyl group having up to 3 carbon atoms, amino group and nitro group; and n is an integer of 1 to 3; which comprises reacting a compound of the formula

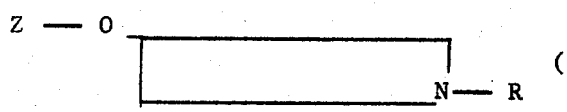

(I)

wherein Z and R as as defined above, with a compound of the formula

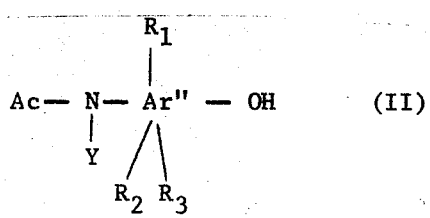

(II)

wherein $R_1$, $R_2$, $R_3$, Ar'', Ac and Y are as defined above.

2. The process of claim 1, wherein the reaction is carried out at a temperature ranging from 130° to 250°C.

3. The process of claim 1, wherein the reaction is carried out in the absence of a catalyst.

4. The process of claim 1, wherein the reaction is carried out in an inert gas atmosphere.

5. The process of claim 1, wherein the compound of the formula (I) is reacted with a compound of formula (II) in the molten state.

6. The process of claim 1, wherein the reaction is carried out in the presence of an inert organic solvent.

7. The process of claim 6, wherein said inert organic solvent is selected from benzene, xylene, ether, benxyl alcohol, decalin or dioxane.

8. A process for the preparation of a 1-aryloxy-3-amino-propanol derivative of the formula

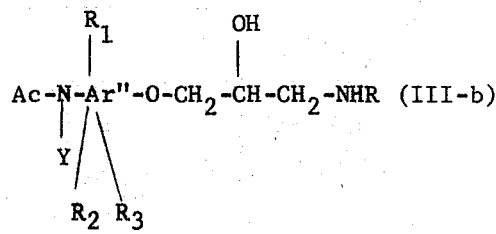

(III-b)

wherein R represents a straight or branched alkyl group having up to 12 carbon atoms or an aralkyl group having 7 to 9 carbon atoms; Ar'' represents a benzene or naphthalene ring; $R_1$, $R_2$ and $R_3$ represent, independently, a hydrogen atom, an alkyl or alkenyl group having 1 to 4 carbon atoms, an alkoxy group having 1 to 4 carbon atoms, a hydroxyl group or an amino group, or $R_1$ and $R_2$ may be bonded together to form an alkylene or ketoalkylene group or to form a 5- 6-membered heterocyclic ring with a hetero atom; Ac represents an organic acid residue selected from the group consisting of organic carboxylic acid residues, organic sulfonyl groups, organic sulfinyl groups, organic sulfenyl groups, organic phosphonyl groups and a triphenylmethyl group; and Y represents a hydrogen atom, an alkyl group having up to 3 carbon atoms or the group Ac, or Y may be bonded to the group Ac to form an ethylenedicarbonyl, maleyl, phthalyl or naphthalyl group; which comprises reacting a compound of the formula

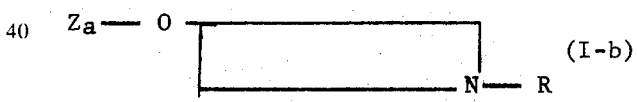

(I-b)

wherein Z is an alkoxyalkyl group, benzyloxymethyl group, or a group of the formula

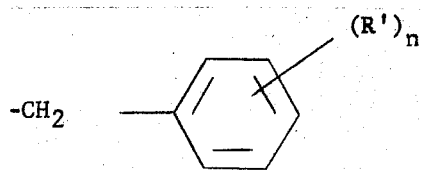

wherein R' is a hydrogen atom or an electron donor group selected from the group consisting of an alkoxy group having up to 3 carbon atoms, an alkyl group having up to 3 carbon atoms, a halogen atom, a halogenated alkyl group having up to 3 carbon atoms, amino group and nitro group; and n is an integer of 1 to 3; and R is as defined above, with a compound of the formula

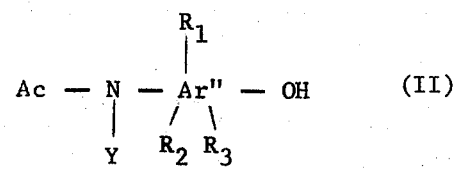

(II)

wherein $R_1$, $R_2$, $R_3$, Ar'', Ac and Y are as defined above, to form a compound of the formula

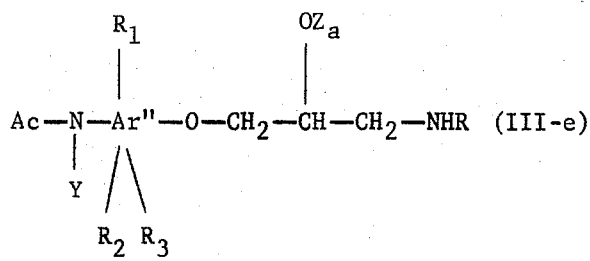

wherein R, $R_1$, $R_2$, $R_3$, Ar'', Ac, Y and $Z_a$ are defined above, and thereafter catalytically hydrogenating the so formed compound of formula (III-e) at a temperature ranging from room temperature to 100°C. under a hydrogen pressure of 1 to 100 atmospheres in the presence of a hydrogenating catalyst selected from Raney nickel, Raney cobalt, Urushibara-nickel, palladium and platinum.

9. The process of claim 1, for the preparation of 1-(acylamino-aryloxy)-3-amino-2-propanol derivative of the formula

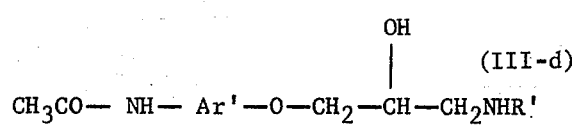

wherein Ar' represents a phenyl or naphthyl group and R' represents a straight-chain or branched-chain alkyl group having 1 to 5 carbon atoms, which comprises reacting an azetidinol derivative expressed by the following formula

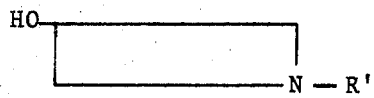

wherein $R_1$ is as defined above, with a compound of the formula $$CH_3CO—NH—Ar'—OH$$

wherein Ar' is as defined above.

10. The process of claim 1, for the preparation of 1-(acylamino-aryloxy)-3-amino-2-propanol derivative of the formula

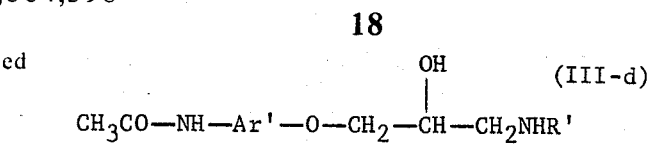

wherein Ar' represents a phenyl or naphthyl group and R' represents a straight-chain or branched-chain alkyl group having 1 to 5 carbon atoms, which comprises reacting an azetidinol derivatives expressed by the following formula

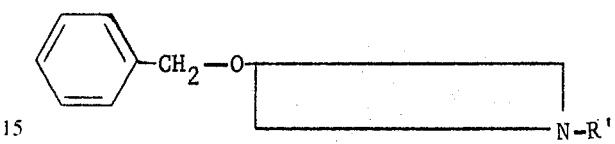

wherein R' is as defined above, or a non-toxic acid addition salt thereof, with a compound of the formula $$CH_3CO—NH\ Ar'—OH$$

wherein Ar' is as defined above, to form a compound of the formula

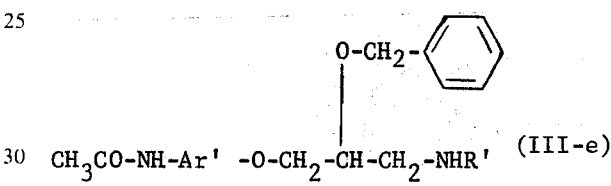

wherein Ar' and R' are as defined above, and thereafter catalytically hydrogenating the so formed compound at a temperature ranging from room temperature to 100°C. under a hydrogen pressure of 1 to 100 atmospheres in the presence of a hydrogenating catalyst selected from Raney nickel, Raney cobalt, Urushibara-nickel, paradium and platinum.

11. The process of claim 1, wherein the reaction is carried out in the presence of a solid caustic alkali in an amount of 1/100 to 1/10 mole per mole of the compound of the formula (II).

* * * * *

UNITED STATES PATENT OFFICE
CERTIFICATE OF CORRECTION

Patent No. 3,864,398　　　　　　Dated February 4, 1975

Inventor(s)　　　YASUSHI SUZUKI ET AL

It is certified that error appears in the above-identified patent and that said Letters Patent are hereby corrected as shown below:

In the Heading, insert the following:

-- Claims priority, application Japan, May 7, 1971, 46/29864. --

In column 16, line 27 thereof: cancel "5- 6-membered" and substitute -- 5- or 6-membered -- therefor.

Signed and sealed this 15th day of April 1975.

(SEAL)
Attest:

RUTH C. MASON
Attesting Officer

C. MARSHALL DANN
Commissioner of Patents
and Trademarks